United States Patent [19]

Schwartz

[11] Patent Number: 4,774,787

[45] Date of Patent: Oct. 4, 1988

[54] VESSEL AND METHOD TO ATTACH NOVELTY ARTICLES TO PLANT FOR DISPLAY

[76] Inventor: Idan Schwartz, Zahal 76, Petach-Tikvah, Israel

[21] Appl. No.: 18,590

[22] Filed: Feb. 25, 1987

[30] Foreign Application Priority Data

Feb. 2, 1987 [IL] Israel ......................................... 81445

[51] Int. Cl.$^4$ .......................... A01G 9/02; A44C 25/00
[52] U.S. Cl. ............................................. 47/66; 63/2; 47/58
[58] Field of Search ............................ 47/58, 9, 14, 56; 63/1 R, 2; 40/10 C, 427

[56] References Cited

U.S. PATENT DOCUMENTS

| | | |
|---|---|---|
| 1,783,430 | 12/1930 | Johnson ................................. 47/58 |
| 2,096,507 | 10/1937 | Czeszcziczki ...................... 47/58 X |
| 2,902,795 | 9/1959 | Heigl et al. ............................ 47/58 |
| 2,984,940 | 5/1961 | Vincent .................................. 47/58 |
| 3,908,308 | 9/1975 | Meyers .................................. 47/56 |
| 3,975,859 | 8/1976 | Muller ................................. 47/9 X |
| 4,118,889 | 10/1978 | Lamlee .................................. 47/14 |
| 4,353,183 | 10/1982 | Estkowski ............................ 47/56 |

*Primary Examiner*—Robert A. Hafer
*Assistant Examiner*—Danton D. DeMille
*Attorney, Agent, or Firm*—Schecter, Brucker & Pavane

[57] ABSTRACT

An apparatus and method for attaching novelty articles, such as small precious stones, to a plant for display. A dicotyledonous seed is secured in a cage to which is attached the novelty article, and the seed, cage, and novelty article are buried in a planting medium, such that when the plant grows from the seed, the novelty article is secured thereto.

23 Claims, 1 Drawing Sheet

VESSEL AND METHOD TO ATTACH NOVELTY ARTICLES TO PLANT FOR DISPLAY

BACKGROUND OF THE INVENTION

1. Field of the Invention

The present invention broadly relates to a vessel for growing novelty articles such as jewelry and the like, and a method for growing such novelty items.

2. Description of the Prior Art

In our day and age there appears to be no limit for the desire to give original and imaginative gifts to loved ones particularly wives and girl friends. Novelty items directed to this need are always welcomed by men. Jewelry, particularly precious stones have always held a special attraction for women and are popular gift items. The jewelry industry has indeed been very imaginative in providing new articles and packaging these in artistic and decorative settings.

One object of this invention is therefore to provide a vessel suitable for growing novelty articles such as a precious stone.

A further object of the invention is to provide a method for growing novelty articles from a suitable planting medium.

SUMMARY OF THE INVENTION

The present invention concerns a novel and unusual novelty item especially suitable for the jewelry line, which in addition to providing an article of jewelry for the person to whom it is presented, also provides mystery and sustained anticipation for some time while the novelty grows out of the vessel and rises together with the plant as it matures from a seed.

The present invention thus comprises a vessel for growing novelty articles such as small gems stones and the like out of a planting medium comprising a container at least partially filled with a hygroscopic, temperature and shock insulating planting medium, a dicotyledoneous seed secured within a cage to which is attached said novelty article, said seed, cage and article being buried in said planting medium, and said container being hermetically sealed against penetration of moisture.

In accordance with this invention it is for example possible to hook a small diamond pendant in a gold setting unto a gold cage, said cage encompassing a dicotyledoneous seed, and burrying the entire unit in a suitable planting medium. When the seed is watered and begins to germinate, the roots grow downwards into the planting medium and the cage which is connected to the plant grows upwards from the medium carrying with it the diamond pendant. The top of the plant will ultimately develop into a first leaf and the cage will be attached at least to part of this leaf as it develops. The cage and attached novelty article may subsequently fall off the leaf.

We have found that it is not as simple as one might think to produce such "growing diamonds" on a commercial scale. One problem which has to be overcome is premature germination. That is when the seeds begin germinating a short time after burial. The cause was found to be the availability of moisture in the atmosphere and planting medium. Such products can not be commercialized because of the short shelf life (dormancy) of the seed. Sealing the container was not sufficient to overcome this problem.

Another problem is the degree of germination or successful plant growth. It is not feasible to market products which give less than 90–95% assurance that a plant will eventually grow. When using for example, a common planting medium, peat, the percent germination is insufficient to make it viable commercially. It was also not clear at first what were the causes for this low rate of germination.

We subsequently discovered that the seeds which are secured within cages are sensitive to temperature changes and to mechanical shock. We found that in order to assure high percent germination the planting medium has to be an insulating medium as well, insulating the seed from rapid temperature changes and mechanical shock. Moreover, the seed has to be isolated from humidity, otherwise it would germinate prematurely, before being sold to a customer. Thus we found that the planting medium must be dry and hygroscopic so that when the vessel is sealed the seed is really dormant and protected until the seal is broken and the seed watered.

It is essential that the seeds not be injured or penetrated in any way by the cage or gem stone, since this will result in irreproducable and irratic results. In a preferred embodiment of this invention the seeds have a polymer coating which also prevents undesirable premature germination. Seed capsules can also be used as for example those disclosed in Israel Pat. No. 32043.

The vessel of this invention, is hermetically sealed thereby preventing the entrance of moisture, as long as it stays sealed. The planting medium protects the seed from temperature changes and mechanical shock. Together, this assures a very high rate for germination when required, up to about 97% success. This means that no refunds or exchanges have to be made, and make these vessels commercially attractive.

The insulating medium can be any hygroscopic medium known to support plant growth. It is preferably pre-dried to minimize moisture accumulating in the vessel upon storage. Furthermore, the medium should also insulate the seeds from the effects of temperature changes and protect them from mechanical abrasion.

We have found either vermiculite or perlite or a combination of these, to be suitable planting medium. A combination of these in equal amounts has undergone successful testing.

The coated seeds as mentioned earlier may be pre-treated with other beneficial materials as known in the art such as with fungicides or other protective coatings. Such seeds are known and sold commercially.

Typical seeds that can be used are all dicotyledons wherein the seed itself or a substantial part thereof grows upwards out of the planting medium.

BRIEF DESCRIPTION OF THE DRAWINGS

The following drawings will illustrate the invention more clearly.

DETAILED DESCRIPTION OF THE PREFERRED EMBODIMENT

Figure 2:
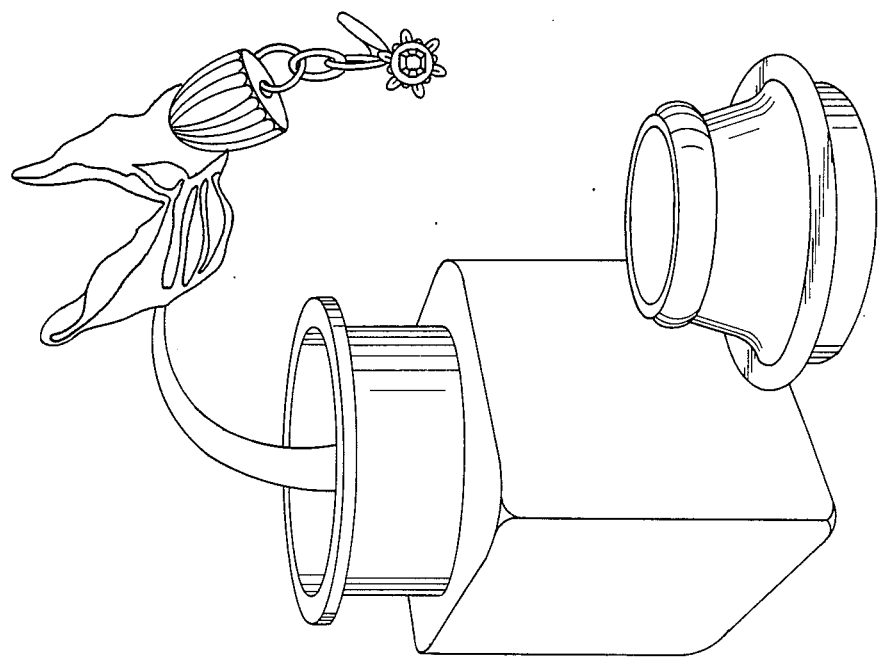
FIG. 2 illustrates a plant with a diamond pendant attached thereto grown in a vessel.
Figure 1A:
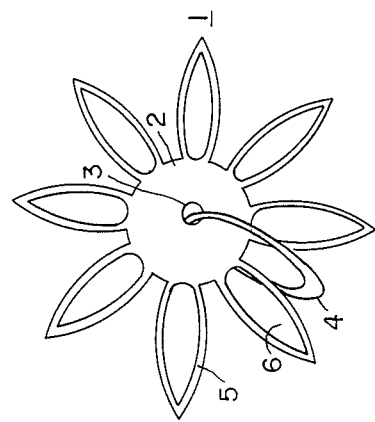
FIGS. 1a & 1b illustrate a typical cage in open and closed position respectively for attaching a novelty item to a seed.
Figure 1B:
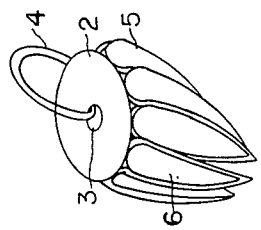

Referring now to FIG. 1a, this shows a sunflower shaped frame 1, preferably gold or silver colored, comprising a round center disk 2 having a hole 3 in its center through which a ring 4 passes for attaching to an article, such as a diamond in a setting (not shown). Petal-like leaves 5, extend radially from the center disk 2 which may be solid or a wire frame hollow inside 6. Frame 1 can be wrapped around a seed as in FIG. 1b entrapping it entirely. This entrapment may or may not surround the seed completely. The closure should however be sufficient to hold the seed securely.

The container for the vessel may be of glass, ceramic, plastic or metal and be of decorative shape and design. It may be transparent or opaque, as long as it can be sealed hermetically it is suitable for this invention. The preferred means for sealing the vessel is to provide a well fitting cover for the container and sealing it with tape.

I claim:

1. A vessel for attaching novelty articles such as small precious stones to plants for display comprising a container at least partially filled with a hygroscopic, temperature and shock insulating planting medium, a dicotyledonous seed, said seed being secured within a cage to which is attached said novelty article, said seed, cage and article being buried in said planting medium, and said container being hermetically sealed against penetration of moisture, whereby when said plant grows from said seed, said novelty article is attached thereto.

2. A vessel as in claim 1 wherein the planting medium is vermiculite.

3. A vessel as in claim 1 wherein the planting medium is perlite.

4. A vessel as in claim 1 wherein the planting medium is a mixture of vermiculite and perlite.

5. A vessel as in claim 4 wherein the planting medium is predried.

6. A vessel as in claim 10 wherein the seed is precoated to prevent undesired germination.

7. A vessel as in claim 11 wherein the seed is cotton seed.

8. A vessel as in claim 12 wherein the cage surrounds the seed entirely.

9. A vessel as in claim 12 wherein the cage surrounds the seed only partially.

10. A vessel as in claim 1 wherein the planting medium is predried.

11. A vessel as in claim 1 wherein the seed is precoated to prevent undesired germination.

12. A vessel as in claim 1 wherein the seed is cotton seed.

13. A vessel as in claim 1 wherein the cage surrounds the seed entirely.

14. A vessel as in claim 1 wherein the cage surrounds the seed only partially.

15. A method for attaching novelty articles to a plant for display comprising, securing a dicotyledoneous seed within a cage to which is attached a novelty article, planting said seed, cage and article in a container at least partially filled with a hygroscopic, temperature and shock insulating planting medium, sealing said container hermetically and subsequently when desiring to grow the article, opening the container and watering the seed until the article has grown at least partially out of the planting medium.

16. A method as in claim 15 wherein the planting medium is vermiculite.

17. A method as in claim 15 wherein the planting medium is perlite.

18. A method as in claim 15 wherein the planting medium is a mixture of vermiculite and perlite.

19. A method as in claim 15 wherein the planting medium is predried.

20. A method as in claim 15 wherein the seed is precoated to prevent undesired germination.

21. A method as in claim 15 wherein the seed is cotton seed.

22. A method as in claim 15 wherein the cage surrounds the seed entirely.

23. A method as in claim 15 wherein the cage surrounds the seed only partially.

* * * * *